United States Patent [19]

Bos

[11] 4,349,490
[45] Sep. 14, 1982

[54] PROCESS OF AND APPARATUS FOR CURVING A CASING OF STRETCHED PLASTIC MATERIAL

[75] Inventor: Arnold Bos, Zolder, Belgium

[73] Assignee: International Chemical Engineering Establishment, Vaduz, Liechtenstein

[21] Appl. No.: 182,298

[22] Filed: Aug. 28, 1980

[30] Foreign Application Priority Data

Aug. 30, 1979 [NL] Netherlands .......................... 7906525

[51] Int. Cl.³ ............................................ B29C 25/00
[52] U.S. Cl. ...................................... 264/25; 264/564;
264/566; 264/567; 264/569; 264/281; 264/285;
264/345; 425/387.1; 425/391; 425/393
[58] Field of Search .......................... 264/25, 563–564,
264/281, 285, 566–567, 569, 345; 425/387.1,
393, 391

[56] References Cited

U.S. PATENT DOCUMENTS

| 2,136,566 | 11/1938 | Schnecko et al. | 264/563 |
| 2,307,614 | 1/1943 | Becker | 264/563 |
| 2,494,273 | 1/1950 | Wigal | 425/387.1 |
| 2,688,766 | 9/1954 | Huckfeldt | 264/563 |
| 3,155,752 | 11/1964 | Riegler | 264/563 |

Primary Examiner—Jeffery R. Thurlow
Attorney, Agent, or Firm—Blanchard, Flynn, Thiel, Boutell & Tanis

[57] ABSTRACT

A casing of stretched plastic material, whether or not filled with a fluid such as gas or air, is wound with some tension about a smooth heated mandrel. During its curved path of travel said casing is on the one hand subjected to a contact or a radiation heat and on the other hand to a convection heat, said contact radiation heat prevailing during a period of time which is greater than that of the convection heat, thus causing the inner curved portion of the said casing to set during the time that the outer portions of the casing windings have already cooled down, so that smooth curved surfaces are obtained.

12 Claims, 6 Drawing Figures

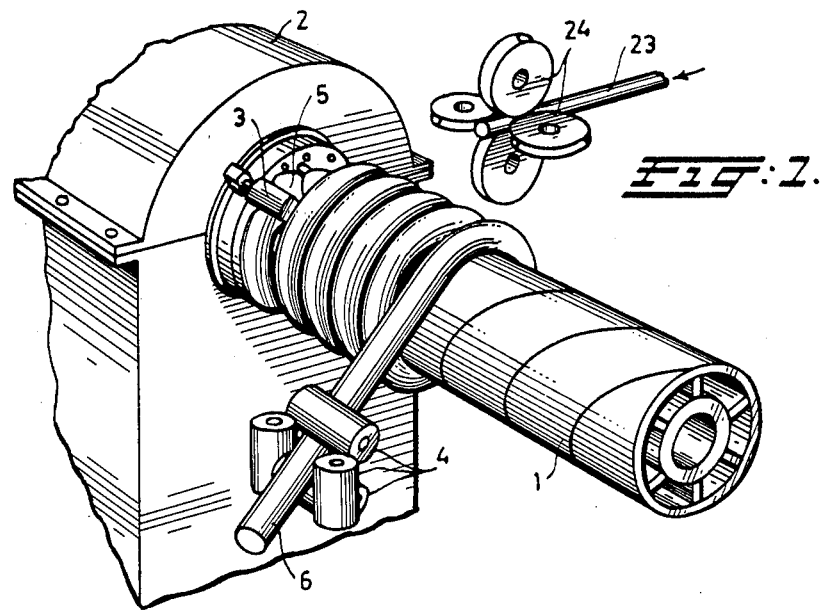
FIG:1.
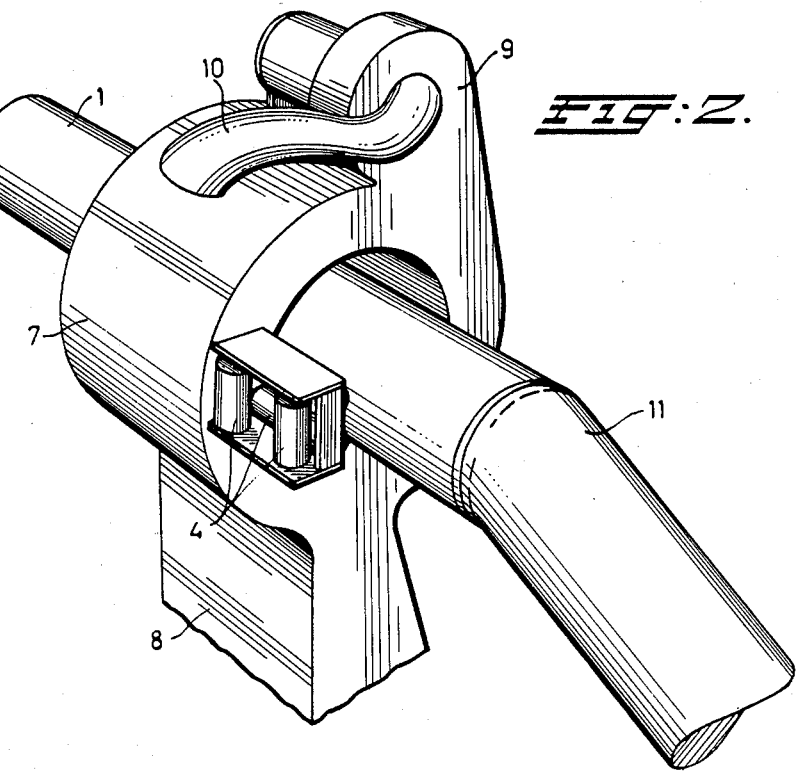
FIG:2.

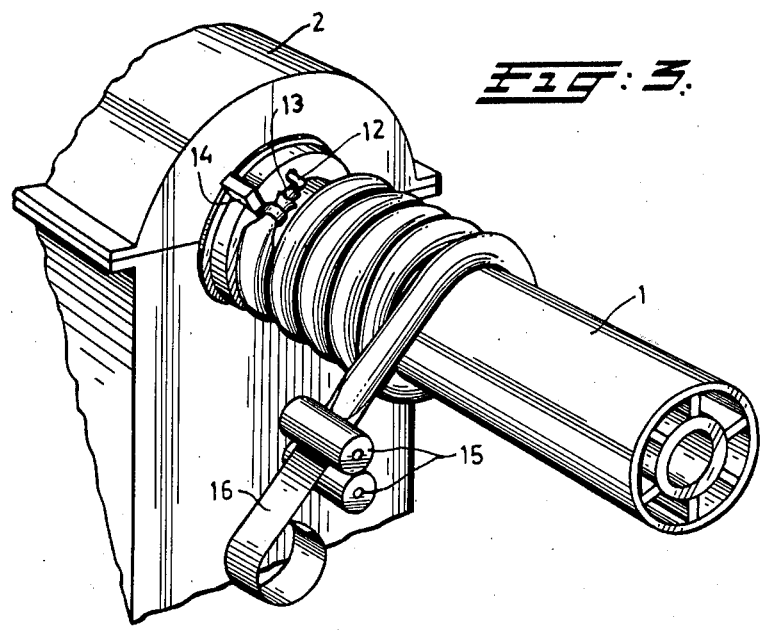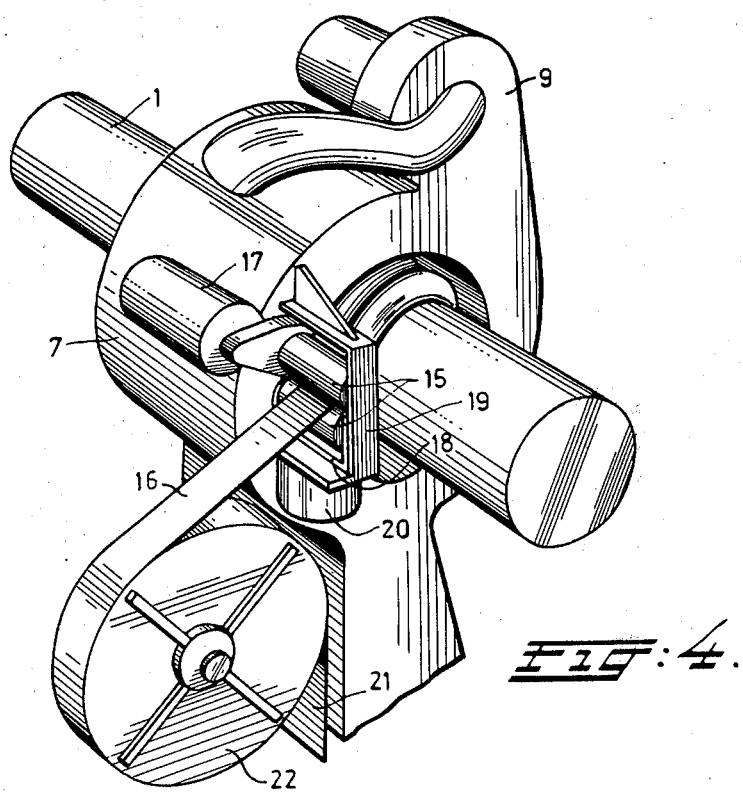

PROCESS OF AND APPARATUS FOR CURVING A CASING OF STRETCHED PLASTIC MATERIAL

BACKGROUND OF THE INVENTION

1. Field of the Invention

The present invention relates to a process of curving a casing of stretched plastic material, which casing is filled with a fluid such as gas or air, curved, heated and subsequently cooled down in its curved position.

The present invention further relates to apparatus for performing the above process.

2. Description of the Prior Art

In the prior art a process has been used by means of which a casing is wound under tension about a smooth, heated mandrel, in order to obtain the desired curve.

The difficulty with said known process is that casing portions, cut off from said casing, have to be filled with a fluid, such as air or gas, prior to curving them. Moreover, the tension with which said casing has to be wound about a mandrel (with respect to the temperature of the latter) is subject to very restricted limits.

So as to curve casings for, for example, sausages, a thinwalled tube of stretched plastic material is curved, and subsequently round sausages, to wit sausages comprising adjacent or almost adjacent extremities, are made from said material. Curving the thinwalled tubes should be performed in a very accurate manner, since proper attention has to be paid to a careful control of the condition of the inner curve, as the inner curved part of casings should be entirely smooth; therefore any crimpling of the relative casing should be avoided during the respective process.

SUMMARY OF THE INVENTION

In view of the foregoing factors and conditions of the prior art it is a primary object of the present invention to provide a curved casing filled with a fluid, such as air or gas, with a surface which is as smooth as possible.

This object is attained in accordance with the invention, in that the respective casing is during its curved path of advance on the one hand subjected to a contact and/or a radiation heat and on the other hand to a convection heat, the thermal treatment by contact radiation heat, being maintained during a period of time which is greater than that of the convection heat.

The casing should preferably be filled with a fluid, such as for example gas or air, directly prior to or during the respective thermal treatment. Said fluid may previously be heated in order to improve the productive curving capacity.

The novel method in accordance with the present invention permits a separate contact or radiation treatment and a convection treatment during the curving procedure of the casing.

This is attained in accordance with the invention in that a casing is so helically wound about a mandrel that the successive windings adjoin each other and is that the contact or radiation heat is exerted in the space enclosed by the helical windings of the casing.

From the above it follows that, notwithstanding the high production speed obtained by the process according to the invention, the curved path of the casing may set in a sufficient manner, i.e. the inner curved portion of the casing will set during the period of time that the outer portions of the windings have already cooled down.

Cooling the inner curved portion of the casing may be effected by means of special features, which for example, either disclose the removal of the respective windings from the mandrel or the release of the tension with which the respective windings are wound about the mandrel and so to remove said windings from said mandrel.

The apparatus for performing the process in accordance with the present invention comprises a rotatable, smooth, heated mandrel, fastening means for fastening the casing to be curved upon said mandrel and a device for the supply of the casing, said casing supplying device, together with a housing comprising a heating device, which housing surrounds the mandrel, being displaceably supported along the mandrel, a drive mechanism displacing the supply device at least in one direction of travel, the speed of which is a function of the number of revolutions of the mandrel and of the diameter of the casing to be disposed about the mandrel.

In a preferred embodiment of the present invention the housing surrounding the mandrel is connected with a blower co-operating with a heating device which blower circulates heated air inside the housing.

The features of the present invention which are believed to be novel are set forth with particularity in the appended claims.

Other claims and many of the attendant advantages of the invention will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a perspective view of a mandrel with (schematically illustrated) supply rollers for a casing to be curved;

FIG. 2 is a perspective view of the mandrel of FIG. 1, the casing supplying device, having the form of rollers, being mounted upon a housing which surrounds the mandrel;

FIG. 3 is a view corresponding to FIG. 1, the casing now being supplied, however, from a storage reel;

FIG. 4 is a view corresponding to FIG. 2, the storage reel in this case being mounted upon the housing;

DESCRIPTION OF A PREFERRED EMBODIMENT

Figure 5:
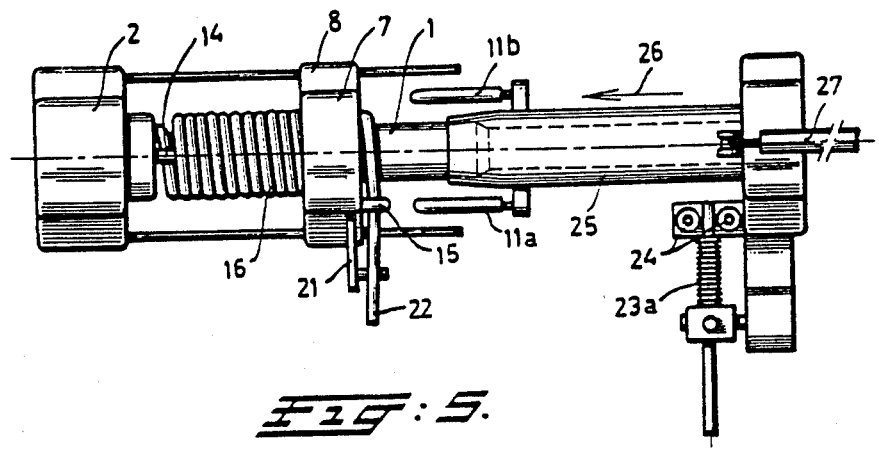
FIG. 5 is a plan view of an apparatus comprising a mandrel and means for the removal of windings from said mandrel of a curved causing.

In order to best understand the present invention a description of a preferred embodiment thereof is provided and is accompanied by drawings. Initially referring to FIG. 1, part of a heating mandrel 1 is shown, having a smooth circumference and being coated with a smooth coating, such as Teflon. The interior of mandrel 1 comprises channels for a heating fluid. The mandrel is supported in a stationary frame 2 of the apparatus and is so driven that said mandrel rotates about its centre line. The initial portion of the mandrel comprises a controllable clasping device 3 in the form of a roller, which roller may be pressed against the mandrel by a drive mechanism (not further elucidated) or be released from the mandrel. The clasping device 3 rotates simultaneously with mandrel 1. A plurality of tension or brake rollers 4 are located parallel with the mandrel 1. An additional heating device may be disposed in between said rollers 4 and said mandrel 1.

A length of a thinwalled casing, such as for instance a stretched plastic material, which has previously been filled with a fluid, such as for example pressurized air, is presently put into the space between the tension or brake rollers 4, while the tied off leading end 5 of the casing 6 is clasped upon the mandrel 1 below the clasping device 3. A rotation of mandrel 1 will cause casing 6 to be wound about said mandrel, the brake rollers 4 in that case being so adjusted that the casing will arrive upon the mandrel with a certain tension. The additional heating device may in that event preheat the casing. Obviously part of the windings of casing 6 wound about the mandrel 1 will contact the smooth surface of said mandrel 1, so that a contact heat will prevail in part of the circumference of the casing, to wit within the windings, while in the adjacent zones inside the windings of the casing, a radiation heat will prevail.

Referring now to FIG. 2, rollers 4 are mounted upon a housing 7 surrounding mandrel 1, which housing is disposed upon a base 8, permitting this entity to be displaced parallel with mandrel 1. To that end base 8 is accommodated upon a bed or upon rails, thus permitting a reciprocating movement along the mandrel. A blower 9 is mounted upon housing 7, said blower cooperating with a heating device (not shown) and blowing hot air through conduit 10 into the interior of housing 7. Housing 7 comprises a space such, that the windings of casing 6 may easily arrive about the mandrel and be wound upon said mandrel adjacent each other on moving housing 7 with rollers 4, simultaneously permitting convection heat from the housing to arrive upon the curved casing upon the mandrel. The length of the mandrel is as large as possible and is dependent upon its rotational velocity, as the strength of the mandrel only allows a length which will not cause said mandrel to get deformed when its length gets too extensive.

Depending upon the diameter of the casing and upon the desired curve to be applied, interchangeable mandrels may be employed having various different diameters. The end of the mandrel comprises a sloping discharge support 11 being firmly clasped at that end. Said support is stationary and the interior of the mandrel is rotatably supported upon said support.

During the curving procedure housing 7 will move from stationary frame 2 toward support 11, base 8 of the housing 7 being so driven to that end that its velocity is a function of the number of revolutions of the mandrel and of the diameter of the casing to be disposed about said mandrel. Consequently, the windings of casing 6 will come to lie upon the mandrel close to each other. As the length of the housing is limited with respect to that of the mandrel, the contact and radiation of the mandrel upon the windings of the casing can obviously be maintained for a longer period of time than the convection heat upon the periphery of the windings of the casing upon the mandrel. When the windings of casing 6 adjoin each other, a space will be formed within the helical housing about the mandrel, in which space a contact radiation heat will prevail, so that after a certain period of time the inner curve of said windings will have the desired smooth properties, and no crimpling will occur. The windings will be disposed upon the mandrel 1 with some tension, this with respect to the action of the brake rollers 4. Said action will cause the inner curved part of the casing to gradually become entirely smooth, the time demanded for this condition depending upon the used temperatures and the thickness of the material employed. Winding the casing about the mandrel may consequently take place rapidly and after this operation has been completed, the housing 7 will return to its original position and the clamping device (see FIG. 1) will be opened, thus causing the tension in the helically wound length of casing to be released, whereupon the windings are so detached from mandrel 1 that they can be conveyed to the discharge and supporting device 11 so as to be cooled down at that location and discharged. The last or first end of the casing may, for example, be removed sidewise from the supporting device 11 and be transferred to a packaging machine, tucking up the windings into a package, and discharging the latter.

At the end of mandrel 1 near the support 11, pressure rollers 11a, 11b (see FIG. 5) are situated for pressing against the mandrel 1 the last tied off end of the casing leaving the rollers 4. An additional stationary heating device may be accommodated near said rollers so as to properly curve said last tied off end.

Referring now to FIG. 3 the clasping device consists of an air nozzle 12 provided with a tapering adjoining collar 13 of a resilient material. Said collar 13 engages a displaceable clasping device 14 in a manner identical to the action of clasping device 3 (see FIG. 1).

Clamping rollers 15 being driven upon housing 7 are used in this case, instead of brake rollers 4, and a casing 16 not filled with a fluid is passed in between said clamping rollers 15, the leading portion of said casing being put upon the adjoining collar 13 of the air nozzle 12 and being fixed by the clasping device 14. After air or another gas has issued from nozzle 12 the casing portion in between said nozzle 12 and the clamping rollers 15 is inflated, thus causing said casing to be wound upon mandrel 1, during rotation of said mandrel, in a manner corresponding to that as described with respect to FIG. 1. The drive mechanism 17 of the clamping rollers 15 is adapted to the circumferential velocity of the mandrel 1. Said drive mechanism may be an electro-motor, the rate of revolution of which is adjustable with respect to the desired prestretching of the material.

Referring now to FIG. 4 one of the clamping rollers 15 is, by means of a yoke 18, displaceably supported in a frame 19, so as to properly position the windings of the casing upon the mandrel. Said yoke 19 may press said rollers 15 against each other in an adjustable manner, by means of an air cylinder 20. The base 8 of housing 7 preferably comprises a support 21 for supporting a casing package, said package in this case having the form of a storage reel. From the foregoing it follows that housing 7 together with clamping rollers 15 forms an inlet for a casing to be curved. In FIG. 4 housing 7 also comprises a blower 9 with a heating device.

Referring now to FIG. 5 one way of discharging the curved casing is shown. Said casing 16 is to that end tied off between the clamping rollers 15 and the mandrel 1, for example, by means of a machine (not shown) known per se and being employed in sausage industries. Subsequently the casing is cut off between the tied off end and the clamping rollers. The last free end of the casing is retained upon the mandrel by means of pressure rollers 11a, 11b. As soon as said pressure rollers are removed from the mandrel, the windings of the casing are released from the mandrel. Hereupon a loose sleeve 25 is slid about the mandrel (in FIG. 5 still in an inactive position). The wall of the sleeve will get within the windings of the casing 16 as soon as the latter surrounds the mandrel (which moves in the direction of arrow 26).

Sleeve 25 having reached its final position and all windings being disposed upon said sleeve, the clasping action of the clasping device 14 is released and the casing 16 will no longer be tensioned by a fluid, so that the entirety of casing and sleeve (the casing now being flat) is removed from mandrel 1. The sleeve is able to rotate simultaneously with the mandrel, thus preventing an adherence of casing windings upon said sleeve. During said axial movement may occur by means of a separate cylinder piston device 27, or by simply having the sleeve run in the same direction as the base 8 and the housing 7, during their return movement.

After having removed the windings of the casing from the sleeve, the casing may be shaped into a package, for instance upon a tucking up or stripping mandrel 23a by means of stripping rollers 24 at the place where the sleeve 25 is supported.

A second possibility is to discharge a curved casing, still filled with fluid, from mandrel 1. To that end a device for tying off the casing end(s) running with mandrel 1 is employed at the location of the clasping device 14, a second device for tying off the casing end(s) then being accomodated between clamping rollers 15 and mandrel 1 in a manner as applied in relation to sausage machines. Tying off the end(s) of a filled casing is known per se and need not be further elucidated. Said tying may take place by means of a metal staple or a cord, depending upon the kind of device used. The heat transfer will correspond to that as described with respect to FIG. 1, but the productive capacity may be increased as yet, provided that the fluid issuing from nozzle 12 is preheated, this with special regard to the first windings of a casing being wound upon a mandrel, the initial winding then being disposed upon the mandrel beyond housing 7 with a view to the space required for pressing the leading end of the casing upon the nozzle 12 comprising the collar 13. A special advantage of this embodiment is that an almost unlimited use can be made of storage reel 22, as no predetermined lengths of casing need be employed and inflated, whilst the ends of said lengths need not be tied off in order to keep them filled with a fluid such as gas or air. Said economy on the productive capacity may even be increased if both housing 7 and nozzle 12 for said fluid, are simultaneously moved along a mandrel, which mandrel may then be a stripping mandrel, a schematic view of which is given in FIG. 1 (numeral 23). In this event clasping device 3 is omitted and replaced by stripping rollers 24, which strip and tuck up the front part of the casing upon stripping mandrel 23 (see also FIG. 1). If air or gas or another fluid is supplied in that event through the stripping mandrel, casing 16 is inflated in between rollers 24 and clamping rollers 15 (see FIG. 3). The result of this action is that the windings of the casing come to lie tightly upon the mandrel, so that a displacement of them along the mandrel is hardly possible. Stripping mandrel 23c and stripping rollers 24 should therefore preferably be displaced along mandrel 1.

Figure 6:
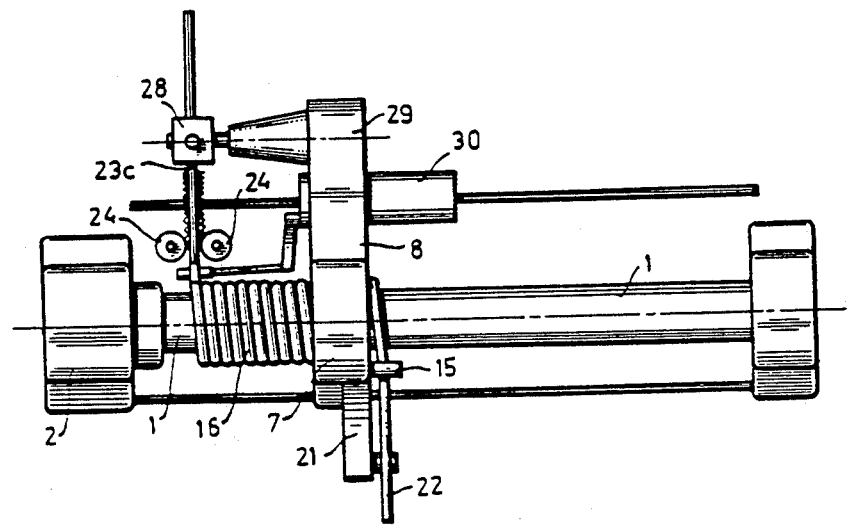
FIG. 6 is a plan view of the apparatus of FIG. 5, however, provided with means for unwinding the curved casing from the mandrel.

Referring now to FIG. 6 the stripping mandrel 23c is mounted upon a rotatable head 28, while a number of stripping mandrels 23 radially extend from said head 28. Fluid, such as gas or air for filling casing 16 wound upon mandrel 1, is in this case supplied via head 28 and stripping mandrel 23c which is directed toward mandrel 1. Head 28 is mounted upon a support 29 displaceable along a sledge 30, and is fastened to base 8 for adjusting the distance between the stripping mandrel 23c and the housing 7. The position of housing 7 with clamping rollers 15 with respect to stripping mandrel 23c then defining the number of curved casing windings upon the mandrel, thus causing the contact or radiation heat to be maintained for a period of time exceeding that of the convection heat, this in dependence of the distance of housing from the stripping mandrel. Moreover, the circumferential velocity of rollers 24 should be adapted to the circumferential velocity of mandrel 1.

What is claimed is:

1. A process for curving an elongated, dry, inflated casing of plastic material, comprising the steps of:
    heating the surface of a cylindrical mandrel;
    winding said casing helically on said cylindrical mandrel so that the adjacent windings contact one another;
    heating the inner surface of the casing windings, due to their engagement with said cylindrical mandrel;
    supplying heated air to the externally exposed surfaces of said casing as said casing is wound onto said cylindrical mandrel and for a first period of time thereafter;
    maintaining said casing in contact with said heated cylindrical mandrel surface for at least a second period of time following said first period of time; and
    removing said casing from said cylindrical mandrel following said second period of time, including coaxially tucking up said casing on an elongated stripping mandrel by rotationally driving a plurality of stripping rollers disposed around and adjacent said stripping mandrel.

2. The process of claim 1, including the steps of:
    releasably fastening a leading end of said casing to said cylindrical mandrel prior to said step of winding said casing on said cylindrical mandrel; and
    releasing said leading end of said casing from said cylindrical mandrel prior to said step of removing said casing from said cylindrical mandrel.

3. The process of claim 1, wherein said step of winding said casing helically on said cylindrical mandrel is carried out by rotating said cylindrical mandrel and advancing a supply of said casing axially along said cylindrical mandrel.

4. The process of claim 1, including the step of inflating said casing by supplying a fluid to the interior thereof.

5. The process of claim 4, wherein said step of inflating said casing includes the step of supplying said fluid to the interior of said casing through a channel provided in said stripping mandrel.

6. The process of claim 1, wherein said step of removing said casing includes, prior to said step of tucking up said casing, the steps of inserting said cylindrical mandrel into a sleeve coaxial therewith and then removing said cylindrical mandrel from said sleeve, thereby transferring said helically wound casing to said sleeve.

7. An apparatus for curving an elongated, dry casing of plastic material, comprising:
    a cylindrical mandrel supported for rotation about its central axis;
    means for heating the surface of said cylindrical mandrel;

means for releasably fastening a leading end of said casing to said cylindrical mandrel;

means for supplying a fluid to the interior of said casing to inflate it;

means adjacent and supported for movement axially of said cylindrical mandrel for supplying said casing thereto under tension;

drive means for rotating said cylindrical mandrel and for moving said casing supply means axially along said cylindrical mandrel at a speed corresponding to the speed of rotation of said cylindrical mandrel so that said casing is wound helically on said cylindrical mandrel with adjacent windings contacting each other;

housing means encircling said cylindrical mandrel, having an axial length substantially less than that of said cylindrical mandrel, and movable axially of said cylindrical mandrel with and immediately following said casing supply means under control of said drive means for immediately and substantially enclosing the portion of said casing most recently wound on said cylindrical mandrel for a first period of time;

means for supplying heated air to said housing means; and means for removing said casing from said cylindrical mandrel at least a second period of time after said housing means has axially passed said casing, including a stripping assembly having a stripping mandrel substantially perpendicular to the axis of said cylindrical mandrel and a plurality of rotationally driven stripping rollers provided around and adjacent the end of said stripping mandrel which is adjacent the axis of said cylindrical mandrel, said rotationally driven stripping rollers coaxially tucking up said casing onto said stripping mandrel;

whereby the externally exposed surfaces of said casing are heated by said heated air in said housing means only for said first period of time after said casing is wound on said cylindrical mandrel, and the surfaces of said casing adjacent said cylindrical mandrel are heated by said cylindrical mandrel for said first period of time after said casing is wound on said cylindrical mandrel and for at least said second period of time following said first period of time.

8. The apparatus of claim 7, wherein said stripping assembly includes a plurality of said stripping mandrels mounted on and extending radially from a rotationally supported head member, said stripping mandrels being successively moved to said position perpendicular to said axis of said cylindrical mandrel as said head member rotates.

9. The apparatus of claim 7, wherein said stripping assembly is spaced axially from said housing means and is movable axially of said cylindrical mandrel with said casing supply means under control of said drive means.

10. The apparatus of claim 9, wherein said inflating means includes a channel through said stripping mandrel and means for supplying said fluid to the interior of said casing through said channel.

11. The apparatus of claim 7, wherein said removing means includes a substantially cylindrical sleeve coaxial with and displaceable axially in a telescoping relationship with respect to said cylindrical mandrel, said helically wound casing being transferred to said sleeve by insertion and removal of said cylindrical mandrel from said sleeve, and wherein said stripping assembly is supported adjacent said sleeve and removes said casing from said sleeve.

12. The apparatus of claim 7, including a smooth coating on the surface of said cylindrical mandrel.

* * * * *